Figure 1:
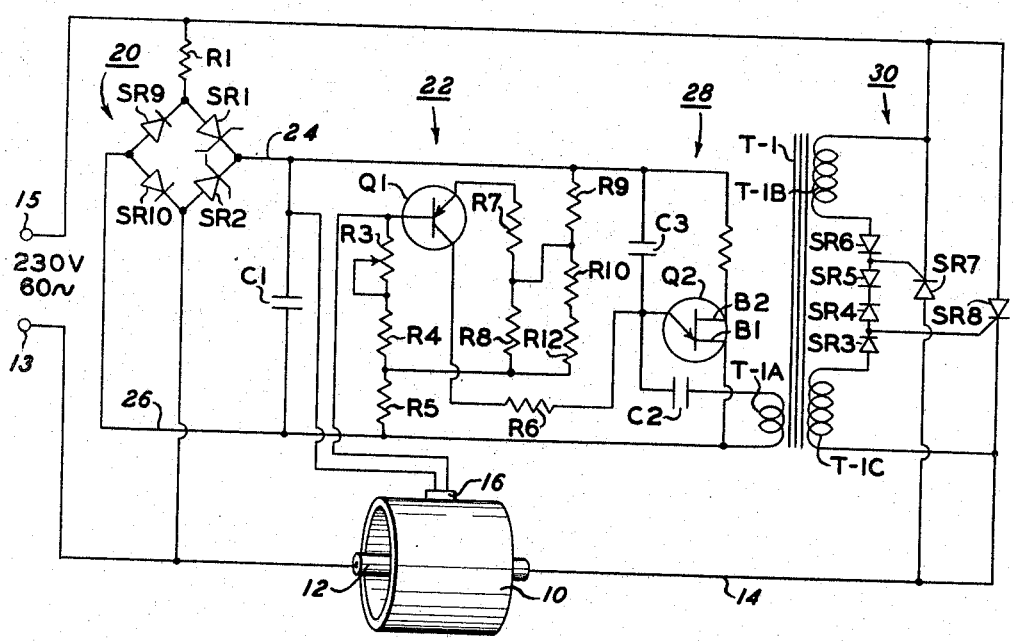

June 20, 1967  T. BERNOUS  3,327,096
TEMPERATURE CONTROL CIRCUIT
Filed Sept. 30, 1964

INVENTOR
TAYEB BERNOUS
BY
ATTORNEYS

United States Patent Office 3,327,096
Patented June 20, 1967

3,327,096
TEMPERATURE CONTROL CIRCUIT
Tayeb Bernous, Penfield, N.Y., assignor to Xerox Corporation, Rochester, N.Y., a corporation of New York
Filed Sept. 30, 1964, Ser. No. 400,476
1 Claim. (Cl. 219—501)

This invention relates to improvements in control circuits and, particularly, to a heater control circuit for use in controlling the temperature of a fuser for fixing xerographic images.

In accurately controlling the temperature of a heater element and to accomplish a set temperature without undue delay, it is imperative that the control circuit for controlling the temperature of the heater element be adapted to permit full energization of the heater element during the initial warmup period for the heater element and, that the energization of the element be gradually decreased as the set temperature is approached. An arrangement such as this will minimize thermal inertia and prevent the temperature of the heat element from overrunning the set temperature which, if close control is absolutely necessary, must be avoided. Although the invention is considered to have general application for purposes of controlling heater elements, it is particularly useful in the field of xerography for controlling the temperature of a fuser device utilized in the fusing of powder images produced by electrophotography onto sheets of paper and the like to which the powder images have been transferred.

The present invention is adapted to control the temperature of a heater element within very precise limits, which function is particularly adapted for xerographic fixing of powdered images. In xerography, electrostatic latent images are developed with finely divided electroscopic powders, or developing material, which are compounded to permit them to be permanently fixed to a copy sheet by heat fixing. In this process, the individual particles of the developing material soften and coalesce when heated so that they become sticky or tackified and readily adhere to the surface of the copy sheet. The heat fusing process operates within precise limitations and, most notably, care must be taken that the correct temperature of the developing material be maintained within a very narrow range. If the temperature is slightly below the fusing temperature requirement, the particles of the material may not fuse together and to the copy to produce a bonded permanent reproduction. On the other hand, if the temperature is over the required melting of the powder, the copy sheet may be charred, discolored or deformed.

For convenience of illustration then, the invention is described with reference to its use as a controller for a heat fuser for xerographic powder images. However, it is to be understood that the control circuit may be employed with equal facility in other fields wherein it is desirable to maintain precise temperature control of an element.

It is the principal object of the invention to control energization of a heater element wherein full electrical power is made available when the heater element is relatively cool in order to arrive at the set temperature as soon as possible and, to provide small pulses of electrical power as the heater element approaches the set temperature in order to maintain set temperature within precise limits.

This and other objects of the invention are attained by means of a control circuit including a charging circuit for charging a capacitor periodically in proportion with the deviation of the temperature of the heater element relative to the set temperature, and a firing circuit directly coupled to the heater element for controlling electrical power thereto in accordance with the discharge rate of this capacitor. A thermistor is utilized to sense the temperature of the heater element and to control the charging circuit in accordance with the difference in temperature between the heater element and the set temperature.

Figure 2A:
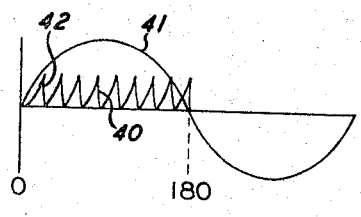
Figure 2B:
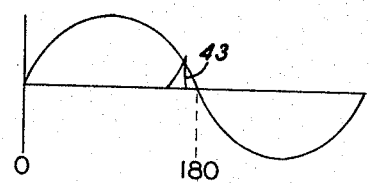

For a better understanding of the invention, as well as other objects and further features thereof, reference is made to the following detailed description of the invention to be read in conjunction with the accompanying drawings wherein:

FIG. 1 illustrates schematically a preferred embodiment of the control circuit of the present invention as applied to a heater element in thermal relation with a roller, the temperature of which is to be controlled; and FIGS. 2a and 2b are illustrations of the control output for the circuit at two stages of operation.

Although it forms no part of the subject invention, there is shown schematically in FIG. 1 a fuser roller 10 which is particularly adaptable for use in a xerographic apparatus for fusing xerographic powder images disposed upon a sheet of copy paper and which is adapted to be heated to a set temperature and maintained at this temperature.

The fuser roller 10 has mounted therein, in thermal relationship, a heater element 12 which may be of any suitable construction. One end of the heater element 12 is connected to a terminal 13, while the other end is connected by a wire 14 to a terminal 15 through a back-to-back configuration of silicon controlled rectifiers, as will be described more fully hereinafter. In thermal relationship with the outer surface of the heater roller 10 there is provided a thermistor 16 which is utilized as the temperature sensitive element for sensing the temperature of the roller 10.

The thermistor 16 may be of the conventional type wherein the resistance thereof varies with the temperature of the object upon which the thermistor is located. The present invention utilizes a thermistor having a usable range within the range of temperatures that the heater roller 10 may be subjected.

The terminals 13 and 15 may be connected to a suitable source of electrical power, but preferably of 230 volts at 60 cycles. This electrical power is applied to a full wave bridge rectifier, generally indicated by the reference numeral 20, which supplied clamped D.C. power predetermined by the zener diodes SR1 and SR2, which power, in the present illustration, is 20 volts. The rectifier 20 is connected to an amplifier circuit, generally indicated by the reference numeral 22, by way of the conductors 24 and 26. A suitable resistor R1 in series with the rectifier circuit 20 provides a voltage drop to the bridge rectifier circuit to limit the input thereto and to provide protection against input transients.

The amplifier circuit 22 includes a transistor Q1 arranged in a common emitter configuration biased by a resistor bridge circuit comprising two branches. One branch includes the thermistor 16 connected between the wire 24 (B+) and the base of the transistor Q1 and which is in series with a fixed resistor R4 and the gain control resistor R3 also connected to the base of the transistor Q1. The other branch includes a bridge divider R9 in series with the resistor R8 which itself is in parallel with a temperature compensating thermistor R10 and a fixed resistor R12. A fixed resistor R7 is connected to the emitter of the transistor Q1 to give the stability required. The above-described resistor bridge circuit is connected in series with a dropping resistor R5 between the wires 24 and 26. From this arrangement, the base signal for the transistor Q1 is related to the thermistor resistance value.

The collector current of the transistor Q1 may vary between zero, as defined by the characteristic curve for the transistor, to a maximum defined by the saturation point for the transistor. These limits are within the range of resistance values which the thermistor may experience and, this range can be shifted by the setting of the potentiometer R3.

Through the resistors R6, the collector current is utilized to charge a capacitor C2 arranged in a triggering circuit, indicated by the reference numeral 28, which essentially comprises a unijunction transistor Q2. The transistor Q2 has its emitter connected to the side of the capacitor C2 being charged by the amplifier circuit 22. The parameters for the resistor R6 and the capacitor C2 being fixed, the charging time of the capacitor C2 will depend upon the resistance value of the thermistor 16, since the collector current for the transistor Q1 depends essentially upon the value of the thermistor resistance.

A negative transient of a certain amplitude in the wire 24 may prematurely cause the firing of the transistor Q2. To prevent this firing of the transistor Q2, which may affect the correct functioning of the triggering circuit, a capacitor C3 is connected between the wire 24 and the emitter of the transistor to maintain the B+ potential for the period of the negative pulse and thereby prevent this inadvertent firing.

The primary T–1A of a transformer T–1 has one end connected in the rectifier conductor 26 and its other end connected to the emitter of the unijunction transistor Q2 through the capacitor C2. This side of the transformer primary T–1A is also connected to the base B1 for the transistor Q2. When the transistor Q2 fires, it creates in the primary T–1A a pulse which will be induced into both of the secondaries T–1B and T–1C. As shown in FIG. 1, the secondary windings T1–B and T1–C are connected in the power conductor 14, which terminates at the terminals 13 and 15, and thereby receive the alternating 230-volt, 60-cycle electrical power. The transformer T–1 forms part of the firing circuit, generally indicated by the reference numeral 30, which also includes a pair of silicon controlled rectifiers SR7 and SR8 connected in back-to-back configuration or, opposite phase sense in the conductor 14 for receiving the electrical energy from the source connected at the terminals 13, 15.

To have the correct phase condition, the negative side of the secondary T–1B is connected to the cathode of the silicon controlled rectifier SR7 and its positive side connected to the gate electrode for the rectifier SR7 through a blocking diode SR6. Similarly, the negative side of the secondary T–1C is connected to the cathode of the silicon controlled rectifier SR8 and the positive side of the secondary SR8 is connected to the gate electrode for the rectifier SR8 through a blocking diode SR3. With the heater element 12 connected in the conductor 14, current will flow thereto only when a positive pulse is applied to the gate electrodes of the rectifiers SR7 and SR8, as the case may be, between 0° and 180° portion of the 60-cycle alternating current applied to the heater element. The rectifier SR7, when triggered, is arranged to permit flow of current in the conductor 14 in only one direction, while the rectifier SR8, when triggered, permits the flow of alternating current in the opposite direction.

Between the gate electrodes for the rectifiers SR7 and SR8, there is arranged in opposite phase sense, two avalanche diodes SR4 and SR5. In the event a transient having an amplitude greater than that for which the rectifiers SR7, SR8 are rated for reverse bias occurs in the conductor 14, the avalanche diode biased in the direction of that transient will fire the corresponding rectifier.

In describing the operation, it is assumed that the roller 10 is at ambient temperature and it is intended that the heater element 12 be energized to maintain the roller at a set temperature, say for example, 320° F. In this event, the thermistor 16 is relatively cool, and its resistance value is high. With the cool thermistor 16 having a high resistance, the voltage at the base for the transistor Q1 is at its lowest level, thereby permitting maximum base-to-collector current to flow. This current is adapted to charge the capacitor C2 in a very short period of time until the firing voltage for the transistor Q2 is attained. With the capacitor C2 and the resistor R6 being fixed, the time constant of the capacitor will depend essentially on the thermistor resistance value since the collector current in the transistor Q1 is a function of this resistance. When the firing voltage has been attained, the capacitor C2 will discharge through the unijunction transistor. The frequency of charging and discharging the capacitor C2 and the pulses developed thereby depends upon the thermistor reactance wherein the greater the resistance, the greater of frequency of charging.

In FIG. 2a, there is illustrated waveform 40 for a typical condition obtained from a thermistor resistance sensing the fuser roller 10 while at ambient temperature. This waveform is imposed upon a single cycle waveform 41 of the alternating current from the source of power at terminals 13 and 15 and induced upon the heater element 12. The number of pulses shown is indicative of the high resistance which causes the capacitor C2 to charge and discharge at a relatively high rate. For each discharge of the capacitor C2 through the transistor Q2, there is a pulse developed in the transformer primary T–1A which will fire the rectifiers SR7 or SR8 alternatively for each cycle of the A.C. source. In the example illustrated, with many charging cycles or pulses per source cycle, the first pulse illustrated by the reference numeral 42 occurs relatively early or near the 0° point in the positive portion of the A.C. source voltage waveform. This results in the full conduction for either of the rectifiers SR7 or SR8. As the first pulse occurs further in the right or toward the 180° point of the A.C. waveform as the charging current for the capacitor C2 decreases, the rectifier still remains in the conductive state but for a lesser period of time, until the pulses extend beyond the positive half of the waveform 41. When this occurs, the conductive state for the rectifier SR7 or the rectifier SR8, as the case may be, will terminate and will no longer be effective to provide electrical energy to the heater element 12. From this it will be apparent that the heater element 12 when its temperature is relatively cool is being energized with maximum power and this amount is proportionately related to the number of charging and discharging cycles for the capacitor C2.

As the set temperature for the fuser roller 10 is approached, the number of charging cycles or pulses produced within an envelope for the waveform of the A.C. source diminishes and as these diminish, the spacing between the pulses for each positive half of the A.C. source envelope will increase whereby the first pulse in the envelope shifts further and further from 0°. As the first pulse shifts toward the 180° point in the A.C. waveform, less and less current is applied to the heater element 12. When at the set temperature, and just previous to the time when all energy will be cut off from the heater element 12, one charging cycle remains for each positive half of the A.C. source envelope. This is shown in FIG. 2b by the pulse 43 which occurs near the end of the positive half of the A.C. waveform. Under these circumstances, the power applied to the heater element 12 will last only from the peak of the waveform 43 until the 180° point for A.C. waveform occurs.

From the foregoing then it will be understood that the variation of the resistance value in the thermistor 16 controls the rate of charging and discharging of the capacitor C2, which in turn, controls the firing times for each of the diodes SR7 and SR8, as the case may be, and that as the firing times lessen, the amount of energization for the heater element 12 also lessens. This arrangement provides maximum energization of the heater element when the same is in a cool or "start up" state and maintains the set temperature of the fuser roller within very close limits.

While the invention has been described with reference to the structures disclosed herein, it is not confined to the details set forth, and this application is intended to cover such modifications or changes as may come within the purposes of the improvements or the scope of the following claim.

What is claimed is:

A temperature control circuit for controlling energization of a heater element positioned within a roller of a xerographic roller fuser; in accordance with deviations in temperature between the roller and a predetermined temperature comprising:

a source of alternating voltage connected to a heater element positioned within a roller of a xerographic roller fuser for heating the same, a pair of unidirectional rectifier components connected in parallel but in opposite phase relative to one another and interposed between said source and the heater element for alternately controlling the energization of said heater element with the alternating voltage when the components are in a conducting state, a pair of avalanche diodes connected in opposite phase relationship between the gate electrodes of said pair of unidirectional rectifier components for controlling the conduction of said unidirectional rectifier components during the occurrence of reverse polarity transient voltages of a magnitude greater than the reverse bias of said unidirectional rectifier components, a first capacitor arranged in the control circuit and associated with said components for conditioning the same to a conducting state when charged with a predetermined voltage, a second capacitor arranged in said control circuit and interposed between said source of alternating voltage and said pair of unidirectional rectifier components to prevent the energization of said unidirectional rectifier components during the occurrence of reverse polarity transient voltages, a circuit including means responsive to the temperature of said roller and associated with said first capacitor for repeatedly charging said capacitor in accordance with deviation of the temperature between said roller and the predetermined temperature whereby the number of charging cycles decreases as said deviation decreases.

References Cited

UNITED STATES PATENTS 3,159,737    12/1964    Dora _____ 219—501

RICHARD M. WOOD, *Primary Examiner.*

L. H. BENDER, *Assistant Examiner.*